United States Patent
Morrison et al.

(10) Patent No.: US 6,263,502 B1
(45) Date of Patent: *Jul. 17, 2001

(54) SYSTEM AND METHOD FOR AUTOMATIC AUDIO AND VIDEO CONTROL SETTINGS FOR TELEVISION PROGRAMS

(75) Inventors: Hugh Boyd Morrison, Indianapolis, IN (US); Sheila Renee Crosby, Pleasanton, CA (US); Robert Joseph Logan, Indianapolis, IN (US)

(73) Assignee: Thomson Licensing S.A., Boulogne (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/819,970

(22) Filed: Mar. 18, 1997

(51) Int. Cl.$^7$ .................................................. H04N 5/445
(52) U.S. Cl. .............................................. 725/47; 348/563
(58) Field of Search ................................... 348/731, 732, 348/725, 906, 10, 11, 7, 12, 13, 563; 455/6.2, 6.3; 381/101, 102, 103; 725/47

(56) References Cited

U.S. PATENT DOCUMENTS

| | | | |
|---|---|---|---|
| 3,812,524 | * 5/1974 | Ivas et al. ............................ | 358/28 |
| 5,191,421 | * 3/1993 | Hwang ................................. | 348/687 |
| 5,241,696 | * 8/1993 | Mori et al. .......................... | 455/186.2 |
| 5,327,176 | 7/1994 | Forler et al. ........................ | 348/564 |
| 5,353,121 | 10/1994 | Young et al. ........................ | 348/563 |
| 5,446,505 | * 8/1995 | Chang Soo et al. ................. | 348/738 |
| 5,479,266 | 12/1995 | Young et al. ........................ | 358/335 |
| 5,479,268 | 12/1995 | Young et al. ........................ | 358/335 |
| 5,585,838 | * 12/1996 | Lawler et al. ....................... | 348/13 |
| 5,635,989 | * 6/1997 | Rothmuller ......................... | 348/563 |
| 5,815,219 | * 9/1998 | Okuizumi ........................... | 348/725 |
| 5,945,988 | * 8/1999 | Williams et al. .................... | 345/327 |
| 5,977,964 | * 11/1999 | Williams et al. .................... | 345/327 |

FOREIGN PATENT DOCUMENTS

| | | | |
|---|---|---|---|
| 2379959 | 9/1978 | (FR) | H04N/5/48 |
| 06078236 | 3/1994 | (JP) | H04N/5/46 |
| 06133239 | 5/1994 | (JP) | H04N/5/44 |

OTHER PUBLICATIONS

Magnavox/Color Television Owner's Manual© 1996 Philips Consumer Electronics Co. pp. 4,32,33.

* cited by examiner

*Primary Examiner*—Thomas Black
*Assistant Examiner*—Uyen Le
(74) *Attorney, Agent, or Firm*—Joseph S. Tripoli; Frank Y. Liao

(57) ABSTRACT

A system and method for automatically adjusting characteristics of a television receiver, such as the video and audio settings, based on characteristics of the program being viewed. The system accesses a pre-defined list of program topics and themes stored in a television database. For each topic and theme, settings for picture quality such as contrast, color and brightness and settings for audio such as audio processor type, bass, and treble are stored. When the system is able to match the currently viewed program with one from the database the audio and video settings are automatically adjusted for that program. If the viewer switches to another program or if one program ends and another begins then the acquisition and adjustment process is repeated. The system can be disabled by the viewer if desired.

8 Claims, 3 Drawing Sheets

| TOPIC | THEME | CONTRAST LEVEL | COLOR LEVEL | BRIGHTNESS LEVEL | AUDIO PROCESSOR | BASS LEVEL | TREBLE LEVEL |
|---|---|---|---|---|---|---|---|
| | | | | | SETTINGS | | |
| SPORTS | ICE HOCKEY | -2 | 0 | -4 | STADIUM SURROUND | +2 | 0 |
| SPORTS | FOOTBALL | +2 | +1 | 0 | STADIUM SURROUND | +4 | 0 |
| SPORTS | GOLF | +2 | +1 | 0 | STEREO | 0 | +3 |
| MOVIES | ACTION | +3 | 0 | 0 | DOLBY PROLOGIC | +4 | +2 |
| MOVIES | COMEDY | +3 | 0 | +1 | DOLBY PROLOGIC | +1 | +1 |
| SERIES | DRAMA | 0 | 0 | 0 | STEREO | 0 | +2 |

FIG. 2

SYSTEM AND METHOD FOR AUTOMATIC AUDIO AND VIDEO CONTROL SETTINGS FOR TELEVISION PROGRAMS

FIELD OF THE INVENTION

This invention relates to program guide data for television systems in general and, in particular, autopilot audio and video attribute setting capabilities for various types of television programs.

BACKGROUND

An Electronic Program Guide (EPG) is an interactive, on screen analog to TV listings found in local newspapers or other print media. An EPG provides 20 information about each program within the time frames covered by the EPG which typically ranges from the next hour up to seven days. The information contained in an EPG includes programming characteristics such as channel number, program title, start time, end time, elapsed time, time remaining, rating (if available), topic, theme, and a brief description of the program's content. EPGs are usually arranged in a two dimensional table or grid format with time on one axis and channel numbers on the other axis. Unlike non interactive guides that reside on a dedicated channel and merely scroll through the current programming on the other channels for the next 2 to 3 hours, EPGs allow viewers to select any channel at any time up to seven days forward. Further EPG features include the ability to highlight individual cells of the grid containing program information. Once highlighted the viewer can perform functions pertaining to that selected program. For instance, the viewer could instantly switch to that program if it is currently being aired. Viewers could also program one touch video cassette recording (VCR) or the like if the television is properly configured and connected to a recording device.

Such EPGs are known in the art and are described, for instance, in U.S. Pat. Nos. 5,353,121, 5,479,268, and 5,479,266 issued to Young et al. and assigned to StarSight Telecast, Inc. These patents are directed to television scheduling systems or EPGs in which a television display can be activated by a viewer that shows the current channel offerings in a table format. The cells of the table which form the columns and rows are irregular in length (row dimension) because not every program spans the same amount of time while the columns are regular in height. Typically, programs are broken down into ½ hour increments and a single program can last in excess of two hours. This is illustrated in FIG. 1 of U.S. Pat. No. 5,353,121 in which "Perfect Strangers" spans from 11:00 AM to 11:30 AM while in the row below "Sesame Street" spans the length of the grid covering in excess of 1 ½ hours.

Television programming extends over a broad spectrum of shows and events. Each show or event has distinct characteristics, or attributes, which are enjoyed most by viewers when various characteristics, or attributes, of the television receiver, e.g., audio and video settings, are matched to the characteristics of the program. The particular program characteristics that are of interest may be indicated by the topic and theme of the program. For instance, musical events are best viewed with audio and video settings which are different from sporting events. Clearly, the settings used for a fast moving, action packed ice hockey game would be different than those used for a symphony orchestra. Further, different sports each require different settings. Golf and football, while both sporting events, each have characteristics distinct from one another that require different audio and video settings to enhance the viewer's enjoyment of the broadcast. Similarly, different types of movies require different audio and video settings. Dramatic movies and comedic movies require different audio and video settings to maximize their appeal to viewers.

The current state of television art allows for automatic picture and sound adjustment. However, it requires viewers to manually select the topic and theme of the program using a menu driven remote control system. Then, the television automatically sets the optimal audio and video settings for the current program.

Thus, a system which can automatically determine program characteristics such as theme and topic information and use the program characteristics to update current receiver characteristics such as audio and video settings without viewer involvement is desired.

SUMMARY OF THE INVENTION

The present invention comprises a system and method for determining characteristics such as topic and theme information for a currently televised program and matching that data to a pre-defined table of optimal receiver characteristics, such as audio and video settings, that are stored in a memory unit. The television automatically changes the current audio and video settings to those defined in the pre-defined list which match that program's topic and theme.

The system requires no interaction with viewers. However, if viewers are unhappy with the pre-determined settings, the feature, termed "auto pilot" can be disabled allowing viewers to manually set the receiver characteristics such as audio and video settings to their own liking.

BRIEF DESCRIPTION OF THE DRAWING

The foregoing and further features of the invention are illustrated in the accompanying drawings in which:

FIG. 2 is an example of database information that the system of FIG. 1 utilizes showing the differing settings for various types of programming.

DETAILED DESCRIPTION

Figure 3:
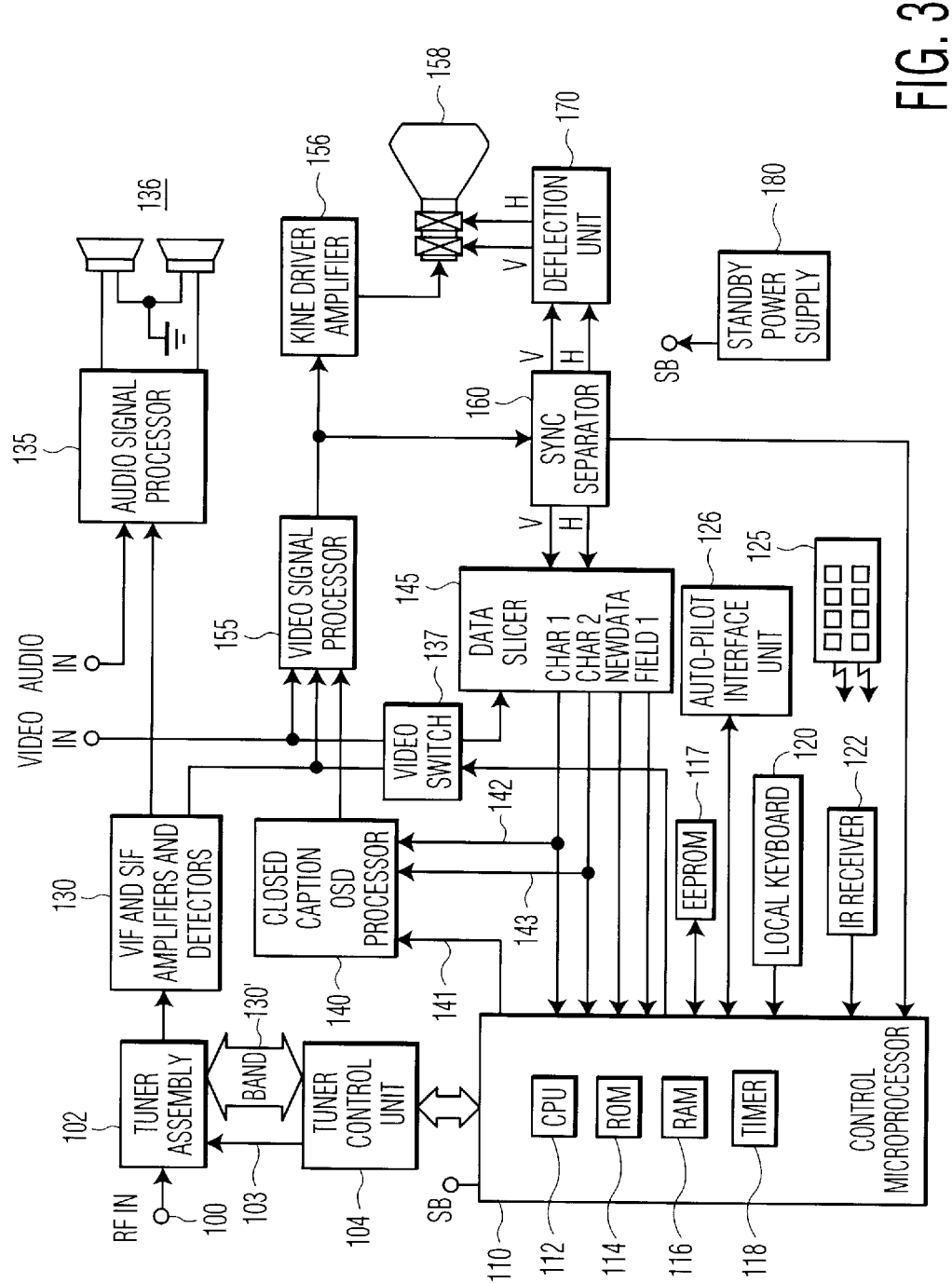
FIG. 3 illustrates a television receiver suitable for use with the invention.

The auto pilot feature which comprises the present invention operates in television systems such as that shown in FIG. 3 having electronic program guides (EPGs). Electronic program guides are available from a number of sources such as StarSight™ and Thomson DSS™. These sources store program information data which viewers can access to determine what is and what will be showing on the various channels. The present invention uses a computer processor within the television to tap into this EPG data and look for information pertaining to characteristics of the program such as the topic and theme of the program. If this information is available, the system will gather it and compare it against a pre-defined table in the television's memory. If a match occurs the television will automatically change the audio and video settings to match those in the table based on the program data thereby yielding the optimal viewing conditions.

Figure 1:
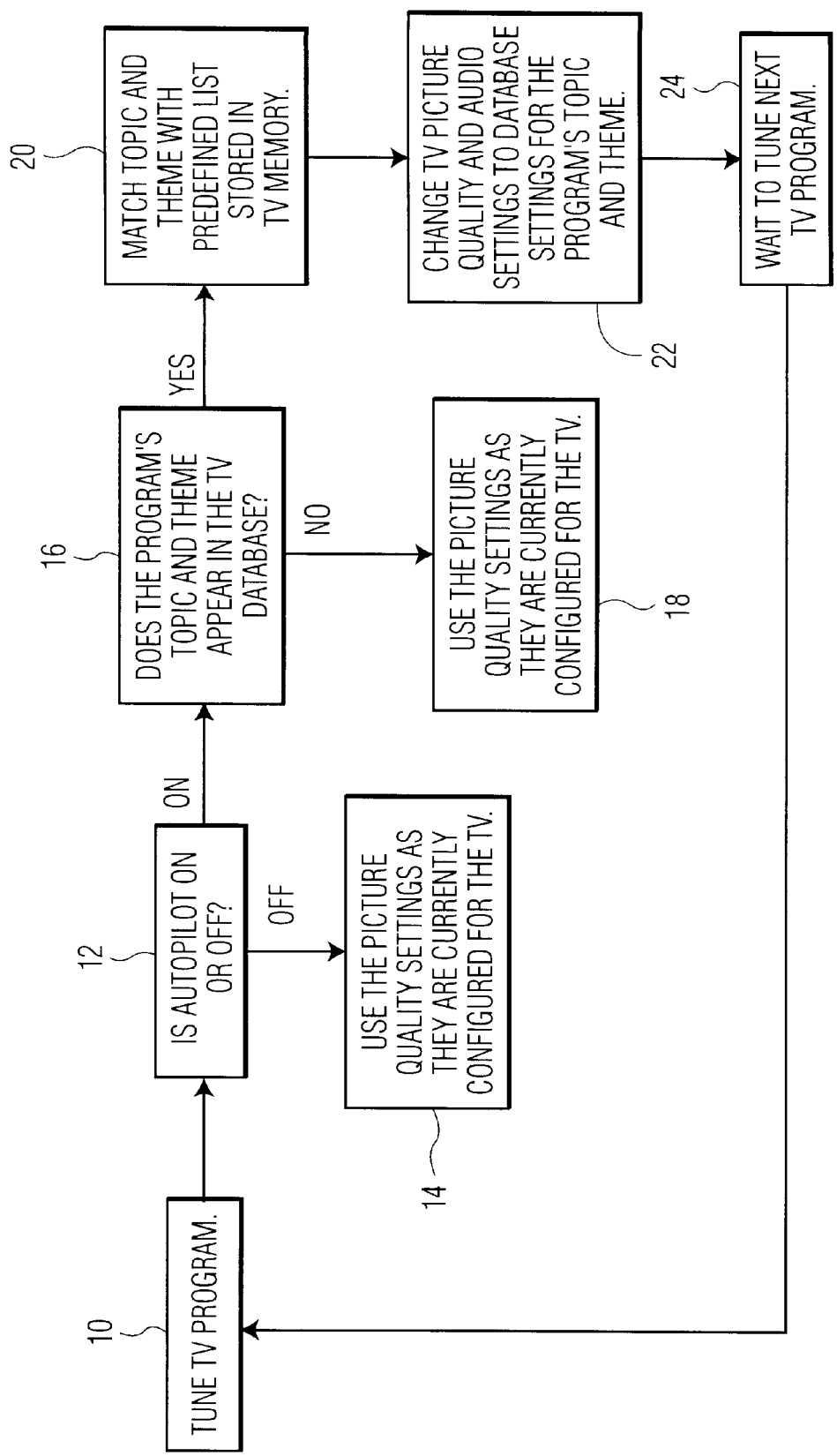
FIG. 1 is a flow diagram of the major block components of the system.

FIG. 1 illustrates a flow diagram of the major block components of the system. First, the television is tuned 10 to a program. Next, it is determined whether the auto pilot feature 12 is switched on or disabled by the viewer. If the auto pilot feature is disabled by the viewer then the picture quality and audio settings remain unchanged 14. Otherwise, the television looks up 16 the program currently being shown in the EPG database to determine whether that program's attributes, i.e. topic and theme, appear in the database. If the topic and theme data is not present 18 in the database then the picture quality and audio settings remain unchanged. If, however, the topic and theme are present in the EPG database then those attributes are matched 20 to a pre-defined table in television memory. The pre-defined table contains picture quality and audio setting information for each possible topic and theme combination. The television will automatically adjust 22 the necessary audio and video settings to match those in the pre-defined table for this type of program. The system will remain dormant 24 until another program is tuned at which time the entire process repeats.

FIG. 2 is an example of a pre-defined table of database information that the system of FIG. 1 utilizes showing the differing settings for various types of programming. The table has eight (8) columns of available information. The first no two columns denote the topic and theme of a program. The next three columns denote the optimum video settings for contrast, color, and brightness for the topic and theme of the first two columns. The last three columns optimize the audio settings for the topic and theme. These settings include the audio processor (Stadium Surround™, stereo, Dolby Prologic™) and the bass and treble levels.

By way of example, assume that a television like the one shown in FIG. 3 has just been tuned to a new program, say an ice hockey game, and that the auto pilot feature is enabled. The levels for the six audio and video settings are at zero from the last program. The television looks up the new program in the EPG database and determines that the program now being viewed is indeed an ice hockey game. Further, an ice hockey game has been pre-defined in memory to have optimal audio and video settings. These settings are then retrieved automatically and the contrast is adjusted to 2, the color level remains at 0, and the brightness set to 4 while the audio processor is set to Stadium Surround™, the bass is adjusted to +2, and the treble remains at 0. If the viewer is dissatisfied with any of these settings then any setting can be subsequently manually adjusted.

Next, suppose the viewer has changed the channel again to tune a comic movie. Auto pilot scans the EPG database for the topic and theme of the new program and determines it to be a comedic movie. Auto pilot next retrieves the audio and video settings for a comedic movie. The contrast is adjusted from 2 to +3, color is unchanged, brightness goes from 4 to +1, Stadium Surround™ becomes Dolby ProLogic™, bass is decreased from +2 to +1, and treble is incremented from 0 to +1. The overall effect is designed to provide the optimal viewing and listening settings for each program. The foregoing process is accomplished without the need for viewer interaction. However, should viewers wish to further refine the picture and audio settings they may do so without affecting the auto pilot operation by adjusting picture and audio settings the conventional way.

FIG. 3 illustrates a television receiver capable of implementing the invention as described above. Referring to FIG. 3, a television receiver includes an RF input terminal 100 which receives radio frequency (RF) signals and applies them to a tuner assembly 102. Tuner assembly 102 selects and amplifies a particular RF signal under control of a tuner controller 104 which provides a tuning voltage via a wire 103, and bandswitching signals via signal fines represented by the broad double ended arrow 103, to tuner assembly 102.

Tuner assembly 102 converts the received RF signal to an intermediate frequency (IF) signal and provides an IF output signal to video (VIF) and sound (SIF) amplifier and detector unit 130. VIF/SIF amplifier and detector unit 130 amplifies the IF signal applied to its input terminal and detects the video and audio information contained therein. The detected video information is applied as one input of a video processor unit 155. The detected audio signal is applied to an audio processor 135 for processing and amplification before being applied to a speaker assembly 136.

Tuner controller 104 generates the tuning voltage and bandswitching signals in response to control signals applied from a system control microcomputer ($\mu$C) 110. The terms "microcomputer", "controller", and "microprocessor", as used herein, are equivalent. It is also recognized that the control function of microcomputer 110 may be performed by an integrated circuit especially manufactured for that specific purpose (i.e., a "custom chip"), and the term "controller", as used herein, is also intended to include such a device. Microcomputer 110 receives user initiated commands from an infrared (IR) receiver 122 and from a "local" keyboard 120 mounted on the television receiver itself. IR receiver 122 receives IR transmissions from remote control transmitter 125. Microcomputer 110 includes a central processing unit (CPU) 112, a program memory (ROM) 114, and stores channel related data in a random access memory (RAM) 116. RAM 116 may be either internal to, or external to, microprocessor 110, and may be either the volatile or non volatile type. The term "RAM" is also intended to include electrically erasable programmable read only memory (EEPROM) 117. One skilled in the art will recognize that if volatile memory is utilized, that it may be desirable to use a suitable form of standby power (such as from STANDBY POWER SUPPLY 180) to preserve its contents when the receiver is turned off.

Microcomputer 110 also includes a timer 118 for providing timing signals as needed. Microcomputer (or controller) 110 generates a control signal for causing tuner control unit 104 to control tuner 102 to select a particular RF signal, in response to user entered control signals from local keyboard 120 and from infrared (IR) receiver 122. IR receiver 122 is powered from Standby Power Supply 180 to be able to receive a command to turn on the receiver.

Tuner 102 produces a signal at an intermediate frequency (IF) and applies it to a processing unit 130 comprising a video IF (VIF) amplifying stage, an AFT circuit, a video detector, and a sound IF (SIF) amplifying stage. Processing unit 130 produces a first baseband composite video signal (TV), and a sound carrier signal. The sound carrier signal is applied to an audio signal processing unit 135 which includes an audio detector and may include a stereo decoder. Audio signal processor unit 135 produces a first baseband audio signal and applies it to a speaker unit 136. Second baseband composite video signals and second baseband audio signals may be applied to VIDEO IN and AUDIO IN terminals from an external source.

The first and second baseband video signals (TV) are coupled to a video processor unit 155 (having a selection circuit not shown). Electrically erasable programmable read only memory (EEPROM) 117 is coupled to controller 110, and serves as a non volatile storage element for storing autoprogramming channel data, and user entered channel data.

The processed video signal at the output of video signal processor unit 155, is applied to a Kine Driver Amplifier 156 for amplification and then applied to the guns of a color picture tube assembly 158 for controlling the deflection of its electron beam.

The television receiver may also include closed caption circuitry as follows. A Data Slicer 145 receives closed caption data at a first input from VIF/SIF amplifier and detector unit 130, and at a second input from the VIDEO IN terminal via a Video Switch 137 which selects the proper source of closed caption data under control of controller 110. Data Slicer 145 supplies closed caption data to Closed Caption OSD Processor 140 via lines 142 and 143. Data Slicer 145 supplies closed caption status data (Newdata, Field1) to controller 110. Under control of controller 110, via control line 141, Closed Caption OSD Processor 140 generates character signals, and applies them to an input of video signal processor 155, for inclusion in the processed video signal. Alternatively, Closed Caption OSD Processor 140 and Data Slicer 145 may be included in controller 110.

System control microcomputer ($\mu$C) 110 controls and operates the autopilot feature. Microcomputer 110 receives user initiated commands from infrared (IR) receiver 122. IR receiver 122 receives IR transmissions from remote control transmitter 125. Microcomputer 110, as applied to the present invention, has several functions. First, it determines whether auto pilot unit 126 is enabled. Next, it searches the EPG database to determine whether the current program topic and theme data appear in the EPG database. If topic and theme data is found then microcomputer 110 searches for the same topic and theme combination in the predefined table stored in ROM 114 and extracts the associated predetermined audio and video setting data for that type of program. The last step in the auto pilot process is to have the microcomputer 110 adjust the picture quality settings to those extracted from ROM 114 for the topic and theme of the program.

While the invention has been described with reference to the preferred embodiment thereof, it will be appreciated by those of ordinary skill in the art that various modifications can be made to the structure and function of individual parts of the system without departing from the spirit and scope of the invention as a whole.

What is claimed is:

1. A method for controlling a video apparatus, comprising the steps of:
   locating a portion of a previously stored electronic program guide related to a selected program in response to the selection of a new program; the electronic program guide being a matrix relating program identification data with program related information, including at least one of topic or theme information;
   looking up at least one of the topic or theme information for the selected program from the respective portion of the previously stored electronic program guide;
   deriving, automatically, without user interaction, from the electronic program guide, at least one of a video or audio setting from a previously stored table in response to at least one of the topic or theme information for the selected program; and
   controlling at least one of an video or audio response of said video apparatus in accordance with said derived setting and repeating said deriving step when one program ends and another begins.

2. The method of claim 1 wherein the video setting comprises at least one of the following: contrast setting, color setting, or brightness setting.

3. The method of claim 1 wherein the audio setting comprises at least one of the following: bass setting, treble setting, or audio processor type setting.

4. A method for controlling a video apparatus, comprising the steps of:
   determining whether an automatic adjustment feature is enabled by a user, and if the automatic adjustment feature is enabled, then per form the following steps:
      locating a portion of a previously stored electronic program guide related to a selected program in response to the selection of a new program;
      the electronic program guide being a matrix relating program identification data with program related information, including at least one of topic or theme information;
      looking up at least one of the topic or theme information for the selected program from the respective portion of the previously stored electronic program guide;
      deriving automatically, without user interaction, from the electronic program guide at least one of a video or audio setting from a previously stored table in response to at least one of the topic or theme information for the selected program; and
   controlling at least one of an video or audio response of said video apparatus in accordance with said derived setting and repeating said deriving step when one program ends and another begins.

5. The method of claim 4 wherein if the automatic adjustment feature is not enabled, then controlling at least one of an video or audio response of said video apparatus as currently configured for said video apparatus.

6. An apparatus comprising:
   user control means for selecting a program;
   means for locating a portion of a previously stored electronic program guide related to the selected program in response to the selection of a new program; the electronic program guide being a matrix relating program identification data with program related information, including at least one of topic or theme information;
   means for looking up at least one of the topic or theme information for the selected program from the respective portion of the previously stored electronic program guide;
   means for deriving, automatically, without user interaction, at least one of a video or audio setting from a previously stored table in response to at least one of the topic or theme information for the selected program; and
   means for controlling at least one of an video or audio response of said video apparatus in accordance with said derived setting and said means for deriving performing another derivation when one program ends and another begins.

7. The apparatus of claim 6 wherein the video setting comprises at least one of the following: contrast setting, color setting, or brightness setting.

8. The apparatus of claim 6 wherein the audio setting comprises at least one of the following: bass setting, treble setting, or audio processor type setting.

* * * * *